United States Patent
Kjellander et al.

(10) Patent No.: US 11,407,213 B2
(45) Date of Patent: Aug. 9, 2022

(54) DECORATIVE HPL PANEL

(71) Applicant: Trespa International B.V., Weert (NL)

(72) Inventors: Birgitta Katarina Charlotte Kjellander, Weert (NL); Henricus Hubertus Maria Kömhoff, Weert (NL)

(73) Assignee: TRESPA INTERNATIONAL B.V., Weert (NL)

( * ) Notice: Subject to any disclaimer, the term of this patent is extended or adjusted under 35 U.S.C. 154(b) by 0 days.

(21) Appl. No.: 17/272,925

(22) PCT Filed: Aug. 30, 2019

(86) PCT No.: PCT/NL2019/050558
§ 371 (c)(1),
(2) Date: Mar. 2, 2021

(87) PCT Pub. No.: WO2020/050713
PCT Pub. Date: Mar. 12, 2020

(65) Prior Publication Data
US 2021/0252904 A1     Aug. 19, 2021

(30) Foreign Application Priority Data
Sep. 5, 2018   (NL) .................................. 2021563

(51) Int. Cl.
*B32B 29/00* (2006.01)
*B32B 5/14* (2006.01)

(52) U.S. Cl.
CPC ............ *B32B 29/005* (2013.01); *B32B 5/142* (2013.01); *B32B 2260/028* (2013.01); *B32B 2260/046* (2013.01); *B32B 2307/402* (2013.01); *B32B 2307/412* (2013.01); *B32B 2457/12* (2013.01)

(58) Field of Classification Search
CPC . B32B 29/005; B32B 5/142; B32B 2260/028; B32B 2260/046; B32B 2307/402; B32B 2307/412; B32B 2457/12
USPC ........................................................ 428/195.1
See application file for complete search history.

(56) References Cited

U.S. PATENT DOCUMENTS

| | | |
|---|---|---|
| 4,401,839 A | 8/1983 | Pyle |
| 4,503,115 A | 3/1985 | Hemels et al. |
| 4,789,604 A | 12/1988 | Hoeven |
| 4,801,495 A | 1/1989 | Hoeven |
| 6,387,489 B2 | 5/2002 | Willemse et al. |

(Continued)

FOREIGN PATENT DOCUMENTS

| | | |
|---|---|---|
| DE | 867946 C | 2/1953 |
| DE | 19811076 A1 | 9/1999 |

(Continued)

OTHER PUBLICATIONS

International Search Report dated Jan. 2, 2020 for PCT/NL2019/050558.

*Primary Examiner* — Betelhem Shewareged
(74) *Attorney, Agent, or Firm* — Suiter Swantz pc llo (57) ABSTRACT

The present invention relates to a decorative high pressure laminate (HPL) panel, comprising an outermost décor layer and a core layer, wherein said panel further comprises at least one photovoltaic element for converting the energy of light into electricity by the photovoltaic effect, said at least one photovoltaic element is located between said outermost décor layer and said core layer.

18 Claims, 8 Drawing Sheets

(56) References Cited

U.S. PATENT DOCUMENTS

2011/0261288 A1   10/2011  Hong et al.
2013/0078437 A1    3/2013  Symkens et al.
2020/0187350 A1*  6/2020  Depres ..................... B32B 1/00
2021/0252904 A1*  8/2021  Kjellander ............ B32B 29/005

FOREIGN PATENT DOCUMENTS

| | | |
|---|---|---|
| DE | 102008062809 A1 | 7/2010 |
| DE | 102012019421 A1 | 6/2014 |
| DE | 102013000135 A1 | 7/2014 |
| DE | 102015220573 A1 | 4/2017 |
| EP | 2645013 A1 | 10/2013 |
| EP | 3405011 A1 | 11/2018 |
| WO | 2010057787 A2 | 5/2010 |
| WO | 2017142412 A1 | 8/2017 |

* cited by examiner

DECORATIVE HPL PANEL

BACKGROUND

The present invention relates to a decorative high pressure laminate (HPL) panel, comprising an outermost décor layer and a core layer, wherein said panel further comprises at least one photovoltaic element for converting the energy of light into electricity by the photovoltaic effect, said at least one photovoltaic element is located between said outermost décor layer and said core layer Furthermore, the present invention relates to a method for dividing such a decorative HPL panel into individual HPL panel segments comprising one or more photovoltaic elements and possibly into individual HPL panel segments without any photovoltaic elements.

Decorative high-pressure compact laminates (HPL) manufactured by the present applicant are known for outdoor applications. Such laminates consist of layers of wood-based fibres (paper and/or wood) impregnated with thermosetting resins and surface layer(s) on one or both sides, having decorative colours or designs. A transparent topcoat is added to the surface layer(s) and cured to enhance weather and light protecting properties. These components are bonded together with simultaneous application of heat and high specific pressure to obtain a homogeneous non-porous material with increased density and integral decorative surface. These panels have been disclosed in, inter alia, U.S. Pat. Nos. 4,801,495, 4,789,604, US Patent application 2013/0078437. In the manufacture of HPL panels, the package, comprising the core layer and surface layer or layers, and the paper layers possibly located between them as well, is thermopressed to make a decorative panel; the thermosetting resins are cured in this process. The temperature is in the range from 120 DEG to 210 DEG C., the pressure is in the range from 10 to 100 bar, and the reaction time is from 1 to 75 minutes. However, if the core layer comprises a wood, plastic, or metal panel, then the temperature and pressure can usually be reduced as far as 80 DEG C. and 5 bar, respectively.

Such panels are non-intelligent panels. This means that the function of these panels is for construction and for aesthetic purposes only. But, interactive panels are known in the art, for example panels provided with light sources.

Functionalized panels are known in the art. For example German Offenlegungsschrift DE 10 2012 019 421 relates to an illuminated facade panel with an integrated light source, particularly in the form of a row-shaped light emitting diode array. In addition, US patent application publication No. 2011/261288 relates to a resin-type light guide plate composition, a backlight unit including the light guide plate formed using the composition, and a liquid crystal display including the backlight unit. German Offenlegungsschrift DE 198 11 076 relates to an illuminated laminar panel hot-pressed from resin prepregs and to a method for manufacturing such a panel.

Panel-like photovoltaic solar modules, used especially as a facade or roof element and having outer connection leads for electrical connection to further solar modules are known from EP 0 867 946. U.S. Pat. No. 4,401,839 teaches a solar panel comprising: at least one solar cell; a rigid transparent sheet overlying the cell; and a sheet of hardened aluminium foil beneath the cell and bonded to the cell and to the transparent sheet, wherein the panel includes upper and lower surfaces and the foil sheet provides a hermetic seal along a portion of the lower surface.

German Offenlegungsschrift DE 10 2013 000 135 relates to a self-supporting façade or roof element, with a front panel and a heat exchanger element in installation orientation, the heat exchanger element is arranged on the inner side of the front panel so that a heat transfer between the front panel and the heat exchanger element is ensured, and connections for the supply and discharge of a heat transfer medium to the heat exchanger element. The front plate is a cement-bonded plate, a fibre cement board, or a natural stone slab or a HPL panel. Photovoltaically active elements can be attached to the outer surface of the front panel, in which case the electrical connection lines can be integrated into the facade element for this purpose.

European patent application EP 2 645 013 relates to a system of solar energy conversion panels configured for application to a vertical surface, the system essentially comprises one or more support brackets, applied vertically and parallel to each other onto the vertical support surface whereto the system is installed, one or more rows of arrays of photovoltaic panels, applied onto respective array support frames, one or more rows of frames, acting as supports for diffusing elements or panels applied onto said frames, one or more first upper coupling systems of the hinge type, adapted to couple the top side of the arrays of photovoltaic panels to the vertical support, one or more hinging systems, adapted to couple the bottom side of the arrays of photovoltaic panels to the top side of the diffusing elements, one or more carriages or sliding systems, adapted to slideably couple the bottom side of the diffusing elements to the support bracket. The diffusing panels may be manufactured by using machined, perforated, coloured metal sheets, e.g. made of aluminum, copper, metal mesh, stretched mesh, etc. The diffusing panels may be manufactured as self-supporting high-pressure laminates.

Today photovoltaic elements have the characteristic looks of striped, dark and glass reflecting panels. Such panels are available in limited shapes and sizes which are determined by the specific photovoltaic manufacturing processes. These constraints bind architects to strict design rules, do they want to include solar harvesters in façades.

On global level, the decrease of $CO_2$ footprint is a driving force to decrease energy losses for buildings. One approach is to increase the insulation which decreases the losses when heating and cooling houses and buildings. However, new regulations require more than optimized insulation. The new regulation advices that (newly constructed) buildings should generate 50% of its energy needs by renewable energy sources (RES). The RES should be part of the building. For higher apartment blocks, for example, it will not be sufficient to only cover the roof with high efficiency photovoltaic elements, other RES on for example the facades are required to reach the targets of the regulation.

BRIEF SUMMARY

An object of the present invention is to provide a decorative HPL panel that is provided with a photovoltaic function where the photovoltaic function is seamlessly integrated into the HPL panel and cannot be seen from the outside.

Another object of the present invention is to provide a decorative HPL panel that is provided with a photovoltaic function wherein the photovoltaic function cannot be easily removed from the HPL panel including the photovoltaic function.

Another object of the present invention is to provide a decorative HPL panel that is provided with a photovoltaic function wherein the mechanical properties of the decorative HPL panel including the photovoltaic function are maintained over a long period of time.

Another object of the present invention is to provide a decorative HPL panel that is provided with a photovoltaic function wherein the flatness of the decorative HPL panel including the photovoltaic function is secured.

The present invention thus relates to a decorative high pressure laminate (HPL) panel, comprising an outermost décor layer and a core layer, wherein said panel further comprises at least one photovoltaic element for converting the energy of light into electricity by the photovoltaic effect, said at least one photovoltaic element is located between said outermost décor layer and said core layer, characterized in that said outermost décor layer comprises a resin impregnated paper, said outermost décor layer being transparent for the wavelength of the incident light that powers said at least one photovoltaic element.

The present inventors found that with such a panel one or more of the aforementioned objects have been achieved. In more detail, by pressing photovoltaic elements in between a core layer, for example a thermoset resin impregnated paper or wood fibres and an outermost décor layer a HPL panel is obtained where the solar energy harvester, that is the photovoltaic elements, is included, functional and non-visible.

In an embodiment of the present decorative HPL panel the outer appearance of said décor layer covering said at least one photovoltaic element is such that said at least one photovoltaic element located between said outermost décor layer and said core layer is invisible.

In an embodiment of the present decorative HPL panel the resin impregnated paper comprises pigments.

In an embodiment of the present decorative HPL panel the resin of the resin impregnated paper is chosen from the group of thermoset resins, preferably based on resin from the group consisting of phenol resin, melamine resin, urea resin, epoxy resin, polyester resin, polyisocyanate resin, melamine acrylate, polyurethane acrylate or combinations thereof.

In an embodiment of the present decorative HPL panel an adhesive layer is located between said at least one photovoltaic element and said core layer. In an embodiment of the present decorative HPL panel the adhesive layer is chosen from the group of thermoset resins, preferably based on resin from the group consisting of phenol resin, melamine resin, urea resin, epoxy resin, polyester resin, polyisocyanate resin, melamine acrylate, polyurethane acrylate or combinations thereof.

In an embodiment of the present decorative HPL panel the HPL panel comprises several photovoltaic elements of different dimensions. The present decorative HPL panel is not limited by the number and/or dimensions of photovoltaic elements incorporated in the decorative HPL panel.

In an embodiment of the present decorative HPL panel the photovoltaic elements are chosen from the group of organic and inorganic photovoltaic sources, especially of the type thin film photovoltaics.

In an embodiment of the present decorative HPL panel the core further comprises another décor layer positioned on the side facing away from said at least one photovoltaic element.

In an embodiment of the present decorative HPL panel the decorative HPL panel further comprises at least one electricity consuming source, said electricity consuming source chosen from the group of light source, such as LED, sensor for measuring the temperature and sensor for measuring the air, and combinations thereof, said electricity consuming source being electrically connectable to said at least one photovoltaic element.

In an embodiment the decorative HPL panel further comprises at least one intermediate layer, said at least one intermediate layer being positioned adjacent to said at least one photovoltaic element.

In an embodiment of the present decorative HPL panel the at least one intermediate layer is positioned between said at least one photovoltaic element and said core layer.

In an embodiment of the present decorative HPL panel the at least one intermediate layer comprises thermal conductive materials. These thermal conductive materials, for example metals, will function as heat dissipating means thereby preventing an unwanted increase of the temperature in the HPL panel. In addition, the occurrence of heat will degrade the efficiency of the photovoltaic element(s). An example of such an intermediate layer is a thermoplastic polymer matrix provided with metallic parts, or graphite. Another example of such intermediate layer is a resin impregnated paper provided with metallic parts, or graphite. The generation of heat may also occur resistances in the electric circuitry. By transporting this heat away from the photovoltaic element(s), the degradation effects are suppressed. This can be obtained by placing a transparent or semi-transparent heat conductive film between the photovoltaic element(s) and décor, or directly below the photovoltaic element(s). Such film can be, but is not limited to, a polyester composite film including compounds chosen from the group of graphene, graphite, iron micro-sized flakes, metal fibres, particles and flakes, or any combination thereof. Such films are for example manufactured by GNext, i.e. graphene polyester films (PET, PP, PLA; thickness 12 or 100 micrometre).

In an embodiment of the present decorative HPL panel the at least one intermediate layer comprises a resin impregnated paper having an inhomogeneous resin distribution, wherein the resin concentration in said resin impregnated paper at an area corresponding to the position of said at least photovoltaic element is higher than another area of said resin impregnated paper.

The resin content is between 20-300% of the paper weight, preferably between 20-70% in the low resin content regions and between 60-250% in the high resin content regions, preferable 100-250%.

This inhomogeneous resin distribution will have the effect that at the position of the photovoltaic element(s) a higher amount of resin is present, resulting in a thicker and/or denser cured network thereby strongly embedding the photovoltaic element(s) in the core layer. In addition the higher concentration of resin at that specific position will penetrate into the surrounding areas thereby creating a stronger network after curing the resin. There are several methods known in this field of the art for applying curable resins to kraft or overlay papers. Besides the dip and squeeze method, where the paper is fully inserted into a resin bath followed by drying, other impregnation methods are also possible. For example, to apply a resin directly to the paper by rotary screen printing, roller coating, engraving, spray coating, curtain coating, flexographic printing, vacuum coating or ink jet coating and the like. It is also possible to use two or several methods simultaneously. Making use of an additive coating process that also applies the resin in a pattern, in transversal and/or longitudinal direction, the amount of resin can be altered locally on a scale of millimetres to meters, or preferably millimetres to centimetres.

The local excess of resin is patterned in the intermediate layer to correspond to the recesses in the core layer, for example a thermoformable sheet or prepreg, resin impregnated papers. The excess resin, which starts to flow during the heat-and-press cycle during production of the final decorative HPL panel or laminate, is used to fill up the cavities around the photovoltaic element(s) in the recess. In this way the relief is levelled out and the surface is flattened.

In an embodiment of the present decorative HPL panel the at least one intermediate layer comprises a resin impregnated kraft paper, wherein the resin is selected from the group consisting of phenol resin, melamine resin, urea resin, epoxy resin, polyester resin, polyisocyanate resin, melamine acrylate, polyurethane acrylate or combinations thereof. Preferably, the paper has a weight of 15-200 g/m$^2$, in particular 70-100 g/m$^2$. In another embodiment, impregnation power and workability may be formed by overlay papers, nonwoven substrates, glass web or combinations thereof, in which connection especially overlay papers have a weight of 10-50 g/m$^2$, preferably 15-35 g/m$^2$.

Especially the location of the at least one photovoltaic element enables the provision of a HPL panel from which the photovoltaic element cannot be taken away without destructing the HPL panel. In addition, according to the present invention the photovoltaic element(s) is/are seamlessly integrated into the HPL panel during the manufacturing process of the panel. Therefore, no additional post-processing actions such as gluing, laminating, cavity making to fit PV elements in the panel need to be taken. Furthermore, the complete integration of the photovoltaic element in the panel has resulted in a panel having a joint free surface. In addition, the original aesthetics of the HPL panel provided with such photovoltaic element(s) will be maintained. The same applies for the mechanical properties of the present HPL panel provided with such photovoltaic element(s). The term "within the decorative HPL panel" as used herein means that the at least one photovoltaic element cannot been seen or touched from the outside of the decorative HPL panel without destructing the decorative HPL panel. This term means also that the at least one photovoltaic element is not positioned at the outermost surface of the decorative panel, i.e. in a visible position, but in a position below the outermost surface of the decorative HPL panel, i.e. in an invisible position. The term "said outermost décor layer being layer being transparent for the wavelength of the incident light that powers said at least one photovoltaic element" covers also a décor layer that is semi-transparent. It is clear that any additional layer(s) between the photovoltaic element(s) and the outermost surface of the panel must show a certain transparency for the wavelength of the incident light that powers said at least one photovoltaic element. In the following description the term "transparent" covers "semi-transparent" as well.

The photovoltaic element that is incorporated in the present HPL panel can be deposited on a paper or another type of a carrier or support material, for example a flexible foil made of plastic or textile, or can consist of rigid or flexible support material.

The photovoltaic element(s) incorporated in the present HPL panel require(s) cables, connectors and other electrical equipment that are well known in this field. In an embodiment these electrical elements are (partly) integrated in the HPL panel as such. According to an embodiment a storage device for the generated electricity is integrated in the present panel.

As discussed above, the mechanical properties of the decorative panel need to be maintained over a long time period. Any deterioration of the mechanical properties needs to be prevented. The present inventors found that the presence of photovoltaic element(s) in the present decorative HPL panel may lead to a local increase of the temperature in the HPL panel, especially during midday in the summer period. Such a local hot spot may have an adverse influence on the performance and life time of the photovoltaic element(s). In addition, the mechanical properties of the decorative HPL panel, especially in the area surrounding the photovoltaic element(s), may be affected. In addition, the flat surface of the decorative HPL panel is an important aspect of the HPL panel. Thus, any irregularity in the surface, e.g. surface relief, of the HPL panel should be prevented. And the incorporation of photovoltaic element(s) in the decorative panel may need additional measurements for maintaining the flatness of the decorative HPL panel. In addition, the inventors found that during the step of pressing the panel at elevated temperatures and pressures the resin present in the resin impregnated paper layers may lead to the formation of yellowish coloured cured compounds. These yellowish coloured cured compounds may have a negative influence on the transparency of these layers. These yellowish coloured cured compounds will lower the energy received by the photovoltaic element(s).

In the present decorative panel the core layer preferably comprises a thermo pressed stack of resin impregnated papers, for example phenol resin impregnated papers. According to another embodiment prepregs, non-wovens and wovens of wood fibres, glass fibres, textile fibres, synthetic fibres, metallic fibres, ceramic fibres, carbon fibres, or a mixture thereof, can be used to partly or completely replace the paper in the resin impregnated stack. In yet another embodiment the resin impregnated paper can be replaced by a prepreg. Such a prepreg can be considered as a consolidated core of a fibre containing material comprised of wood or cellulose fibres which are coated with a thermosetting synthetic resin. The thickness of prepregs may be considerable larger than a typical paper, and may include thicknesses >1 cm, or even greater.

A method for manufacturing prepregs has been disclosed in U.S. Pat. Nos. 4,503,115 and 6,387,489 in the name of the present applicant. For example according to U.S. Pat. No. 6,387,489 after drying the fibres are stored or passed directly to spreader equipment. The resin-treated fibres may be further processed without or with pigments. The mixture made from resin-treated fibres and pigments is introduced to spreader equipment which deposits the fibres and the pigments continuously and uniformly with random orientation, producing, distributed across the entire width of a horizontal conveyor belt, a web-like mat, which is press-molded either individually or together with other web-like mats of this type, to form the core layer. After continuous shaping of the mat on the conveyor belt, using scrapers, brushes, belts or rollers, the prepreg is given a preliminary press-moulding and compacted, with thickness reduction, in calendering equipment.

In another embodiment it is also possible to locate the photovoltaic element(s) within the thermo pressed stack of resin impregnated papers.

In order to prevent the formation of an uneven outer surface of the present panel the present inventors found that is possible to provide the stack of resin impregnated papers with one or more recesses. Those recesses can be used to position the photovoltaic element(s) in the respective recesses. In such an embodiment it is preferred that the recesses provided with the photovoltaic element(s) are covered with at least one thermo pressed resin impregnated paper. The formation of one or more recesses is valid for each type of core layer as mentioned above. The recesses can also be used for placement of the battery, i.e. a device for storage of electricity, for cables, connectors and other electrical equipment.

The present construction of the HPL panel and the photovoltaic element(s) is such that the photovoltaic element(s) cannot be removed without destructing the HPL panel. During the step of bonding together the individual components, i.e. the core layer, the photovoltaic element(s) and the décor layer, with simultaneous application of heat, for example ≥120° C., and high specific pressure (>7 MPa) a homogeneous non-porous HPL panel with increased density and integral decorative surface is obtained. The photovoltaic element(s), optionally the cables, connectors and other electrical equipment as well, are thus fully embedded in the present HPL panel and all these devices are invisible from the outside. Methods for manufacturing decorative HPL panels have been disclosed in, inter alia, U.S. Pat. Nos. 4,801,495, 4,789,604, US Patent application 2013/0078437. The relevant parts disclosed in these publications regarding the process conditions for manufacturing these HPL panels should be incorporated here by reference.

The present invention is also suitable for the production of CPL (continuous press laminates) and LPL (low pressure laminates). Low pressure laminates comprises materials used to coat surfaces, formed by two or three papers impregnated with melamine thermosetting resins to which plasticisers are added. The papers are joined strongly together by hot pressing at low pressures. The physical and technical properties of these materials are inferior to those of high pressure laminates, but are more than adequate for coating furniture components that will not undergo much stress and, in particular, are suitable for producing edges. A HPL (High Pressure Laminate) is manufactured via a high pressure/high temperature lamination process, while a CPL (Continuous Pressure Laminate) is laminated under low pressure. This results in variations in performance particularly in terms of strength and ease of installation. The present invention also covers the Double Belt Press (DBP) for the production of Continuous Pressed Laminate (CPL). CPL is decorative paper impregnated with resins and fused under heat and high pressure with resin impregnated backer(s). Laminate properties are similar to standard HPL and typical thickness range is 0.4 mm to 1 mm. Flexible CPL is decorative paper impregnated with flexible thermosetting resins and fused under heat and high pressure with resin-impregnated backer(s).

The present inventors found that instead of pressing the photovoltaic element(s) in-between the papers with thermo curable resins, photovoltaic element(s) can be placed in cavities made in a thermo formable sheet of material. The dimensions of the cavity are preferably such that after placing the photovoltaic element(s) in the cavity of the sheet, the surface of the sheet will be completely flat. The sheet with photovoltaic element(s) is placed within a stack of décor and papers with thermo curable resin, just below the décor, or with at least one paper with thermo curable resin between the sheet and the décor. In a specific embodiment the side of the sheet where the photovoltaic element(s) is placed is, is closest to the décor. According to another embodiment the décor is laminated onto the sheet with photovoltaic element(s) the sheet acting as the core material. The adhesion can be stimulated by applying an adhesive on the sheet, the décor or both, before lamination.

In an embodiment the substrate layer of the décor layer is chosen from the group of resin impregnated papers, non-wovens and wovens made of wood fibres, glass fibres, textile fibres, synthetic fibres, metallic fibres, ceramic fibres and carbon fibres, or a combination of these fibres. In a specific embodiment resin impregnated papers can be combined with non-wovens and/or wovens. In another embodiment the substrate layer of the décor layer can also be chosen from the group of polymeric foils, metallic foils and ceramic foils, or a combination of anyone of these foils. In a specific embodiment resin impregnated papers can be combined with non-wovens and/or wovens and/or foils as mentioned here.

The thermo formable sheet may include one or more thermoplastic polymers, wherein the thermoplastic polymers will plastically deform upon applying thermal pressure. The thermoplastic sheet may include fillers, as minerals, reinforcement fibres of e.g. glass, synthetic, carbon, or other types. The purpose of the fillers is to modify the physical properties of the thermo formable sheet, as e.g. reinforce it.

The present invention also relates to a decorative HPL panel wherein the core comprises at least one thermo formable sheet. In such an embodiment the core may further comprise a stack of resin impregnated papers, wherein the at least one thermo formable sheet is positioned between the décor layer and the stack of resin impregnated papers. In another embodiment a thermo curable layer is preferably positioned between the décor and the thermo formable sheet, a thermo curable layer, preferably resin impregnated paper.

The at least one thermo formable sheet is preferably provided with one or more recesses, in which one or more recesses the photovoltaic element(s) is/are placed. Such a recess may also contain other devices, such as a battery, i.e. a device for storage of electricity, cables, connectors and other electrical equipment.

The integrated photovoltaic element(s) is/are encapsulated by the HPL panel, which protects the integrated photovoltaic element(s) to the environment. Such environmental protection can include but is not limited to wind, weather, sun, chemicals, scratches, temperature, moisture and humidity. The encapsulation also prevents unintentional removal (theft) of the photovoltaic element(s) and other devices when incorporated in the panel as well.

The present decorative HPL panel can be used in outside environmental areas, such as exterior walls, ceilings and facades.

The advantages of the present HPL panel can thus be identified as follows: non-visible, seamless integration, flatness of outer surface, encapsulation, i.e. protection against environment, whereas the physical properties of panel remain unaltered compared to a panel without the present photovoltaic element(s).

The present invention furthermore relates to a method for dividing a decorative HPL panel as discussed above into one or more individual HPL panel segments, said HPL panel segments thus obtained may comprise HPL panel segments having one or more photovoltaic elements and HPL panel segments without any photovoltaic elements, said method comprising the following steps:

i) providing a decorative HPL panel, comprising an outermost décor layer and a core layer, said HPL panel further comprising several photovoltaic elements for converting the energy of light into electricity by the photovoltaic effect, said several photovoltaic elements are located between said outermost décor layer and said core layer, wherein said several photovoltaic elements are positioned in the same plane of said HPL panel, said outermost décor layer being transparent for the incident light that powers said several photovoltaic elements, said outermost décor layer making said several photovoltaic elements invisible;

ii) determining a size of one or more segments in the decorative HPL panel of i);

iii) cutting the decorative HPL panel of i) in accordance with the size determined according to step ii) into HPL panel segments having one or more photovoltaic elements and possibly HPL panel segments without any photovoltaic elements.

In accordance with the method it is now possible to manufacture in one step a HPL panel having several photovoltaic elements, wherein the HPL panel thus obtained can be further processed into one or more individual HPL panel segments. The HPL panel segments thus obtained may comprise HPL panel segments having one or more photovoltaic elements, wherein said photovoltaic elements may have different sizes, dimensions and performance qualities. In addition, the HPL panel segments thus obtained may comprise HPL panel segments without any photovoltaic elements. As an example, the starting HPL panel may have 10 individual photovoltaic elements. After step iii) there are 5 separate HPL panels, 3 of them having only one photovoltaic element and 1 of them having 5 photovoltaic elements and one of them 2 photovoltaic elements. The size of these 5 HPL panels may be the same or different in size. The same applies for the photovoltaic elements. The present method thus provides a very flexible process for obtaining decorative HPL panels.

In an embodiment the outer cladding of a building consists of at least one decorative HPL panel as discussed above. In another embodiment the outer cladding of a building consists of individual HPL panel segments having one or more photovoltaic elements obtained according to the method discussed above. In an embodiment the outer cladding of a building may further consist of individual HPL panel segments without any photovoltaic elements obtained according to the method discussed above.

The present invention furthermore relates to interior furniture consisting of at least one decorative HPL panel according and/or consisting of individual HPL panel segments comprising one or more photovoltaic elements obtained according to the method discussed above.

On basis of the availability of HPL panel segments having one or more photovoltaic elements and HPL panel segments without any photovoltaic elements, wherein these HPL panel segments originate from the same HPL panel the present inventors also propose a method for providing an outer cladding of a building with HPL panel segments having one or more photovoltaic elements and HPL panel segments without any photovoltaic elements. An advantage is that these HPL panels have the same outer appearance since they originate from the same HPL panel. Such a method comprises the following steps:

a) determining the amount of sunlight incident on the outer cladding of a building;

b) positioning individual HPL panel segments comprising one or more photovoltaic elements on the outer cladding in an area having a high amount of incident sun light, and possibly c) positioning individual HPL panel segments without any photovoltaic elements on the outer cladding in an area having a low amount of incident sun light.

Such a method will take advantage of the availability of the two types of HPL panel segments. The ones without the photovoltaic elements will be positioned in an area in which the amount of incident sun light is low, and the ones with the photovoltaic elements will be positioned in an area in which the amount of incident sun light is high. Thus, there is an optimum us of the capacity of the photovoltaic elements.

Façade elements with invisible solar energy harvesters is allowing the architects to design energy efficient buildings without restrictions in aesthetics.

Additionally, including the photovoltaic elements in High Pressure Laminates (HPL) allows the architects to design the façade without constraints in size of the PV units. The HPL panels can be significantly larger than the available sizes of solar harvesters.

A bonus is that the PV elements are fully integrated into the HPL panel, and also protected to the environment and weather conditions. Not only are the PV elements invisible, but can also not be removed without destroying the panel. These features limits the threats of thefts of these costly harvesters.

The present inventors assume that the present decorative high pressure laminate (HPL) panel including photovoltaic elements are less efficient than the 'virgin' PV elements, this due to the covering decorative surface. Remembering that the façade surface generally is larger than the roof surface of large constructions, the electricity generated by the present decorative high pressure laminate (HPL) panel including photovoltaic elements can still be a significant contribution for the façade.

In addition, in the cradle of the internet of things (IoT) era all 'things' are connected wirelessly with each other. 'Things' with sensing capabilities can communicate its information to other 'things'; e.g. a thermometer at the outside of a building communicates the temperature to the central heating system of the building, which is reacting by e.g. increasing the heating, or starting the air-conditioning. Thus, the need for autonomous 'things' (e.g. sensors with wireless access) will increase. Currently, sensors with wireless access are designed to operate at (ultra) low power, in the micro-watt range. The present invisible solar harvester HPL panels can potentially power such sensor with wireless access, making such smart panels self-sufficient in energy.

In the present invention thin-film solar cells may be used as PV elements. In thin-film solar cells the energy converting material is a thin layer and deposited supporting substrates. The substrate can be rigid, as e.g. glass, or flexible as e.g. plastic foils or metal foils. The type of energy converting, photovoltaic, material distinguish the type of thin film solar cell. Examples on thin film photovoltaic materials are amorphous silicon (a-Si), cadmium telluride (CdTe), copper indium gallium selenide (CIS/CIGS), and organic photovoltaic cells (OPC). The manufacturing methods of thin film solar cells is generally easier to upscale to mass production, and thus cheaper to manufacture, compared to the traditional mono- and polycrystalline solar cells. On the other hand, the thin-film solar cells are in general less efficient. Mass-production is simple. This makes them and potentially cheaper to manufacture than crystalline-based solar cells.

BRIEF DESCRIPTION OF THE DRAWINGS

Further advantages of the invention will become apparent by reference to the detailed description of preferred embodiments. Although the figures shown here only mention one photovoltaic element the present invention is not restricted to a specific number of photovoltaic elements. On basis of legibility and clarity all electrical (internal and external) connections and power sources have been omitted in the figures.

DETAILED DESCRIPTION

In the Figures the same reference numbers are used for the same components.

Figure 1:
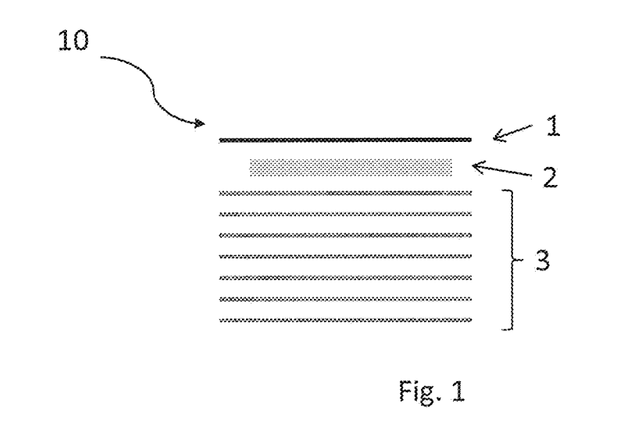
FIG. 1 shows a decorative HPL panel according to the present invention.

FIG. 1 shows a decorative high pressure laminate (HPL) panel 10, comprising an outermost décor layer 1 and a core layer 3, wherein said panel 10 further comprises a photovoltaic element 2 for converting the energy of light into electricity by the photovoltaic effect. Photovoltaic element 2 is located between outermost décor layer 1 and core layer 3. Outermost décor layer 1 comprises a resin impregnated paper and is transparent for the wavelength of the incident light that powers photovoltaic element 2. Although photovoltaic element 2 is shown here as one single unit, photovoltaic element 2 may consist of several individual photovoltaic elements as will be shown in, for example, FIG. 4. Core layer 3 is in FIG. 1 a stack of resin impregnated paper layers.

Figure 2:
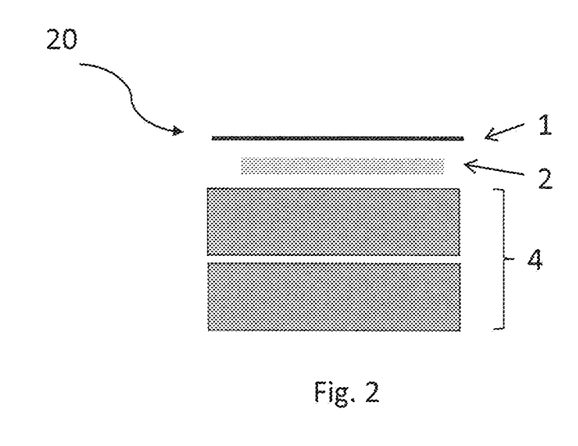
FIG. 2 shows another embodiment of a HPL decorative panel according to the present invention.

FIG. 2 shows a decorative high pressure laminate (HPL) panel 20, comprising an outermost décor layer 1 and a core layer 3, wherein said panel 10 further comprises a photovoltaic element 2 for converting the energy of light into electricity by the photovoltaic effect. Photovoltaic element 2 is located between outermost décor layer 1 and core layer 4. Outermost décor layer 1 comprises a resin impregnated paper and is transparent for the wavelength of the incident light that powers photovoltaic element 2. Although photovoltaic element 2 is shown here as one single unit, photovoltaic element 2 may consist of several individual photovoltaic elements as will be shown in, for example, FIG. 4. In FIG. 2 core layer 4 is a prepreg but other types of core layers can be used as well.

Figure 3:
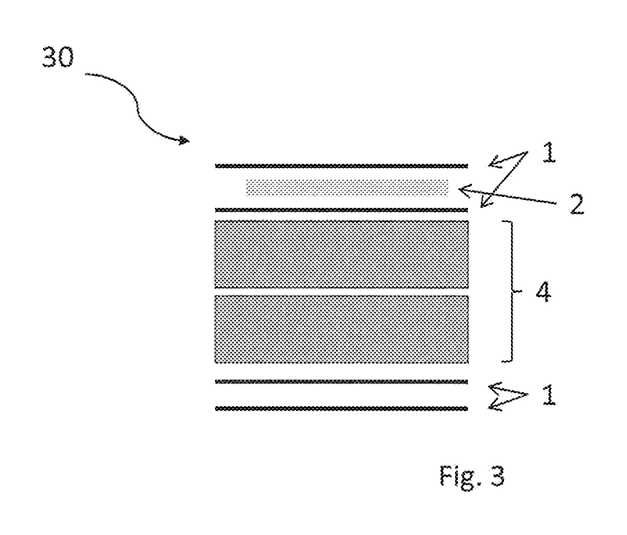
FIG. 3 shows another embodiment of a decorative HPL panel according to the present invention.

FIG. 3 shows a decorative high pressure laminate (HPL) panel 30, comprising a two décor layers 1 and a core layer 3, wherein the two décor layers 1 are positioned on both outermost surfaces of panel 10. Panel 10 further comprises a photovoltaic element 2 for converting the energy of light into electricity by the photovoltaic effect. Photovoltaic element 2 is here located in a sandwich construction between two décor layers 1 and core layer 4, i.e. prepreg. Outermost décor layer 1 comprise a resin impregnated paper and is transparent for the wavelength of the incident light that powers photovoltaic element 2. The inner décor layer, i.e. the layer positioned between photovoltaic element 2 and core layer 4, does not need to be transparent for the wavelength of the incident light. The décor layers 1 positioned on the other surface of the core layer do not need to be transparent for the wavelength of the incident light as well. Although photovoltaic element 2 is shown here as one single unit, photovoltaic element 2 may consist of several individual photovoltaic elements as will be shown in, for example, FIG. 4. In FIG. 3 core layer 4 is a prepreg, but other types of core layers can be used as well.

Figure 4:
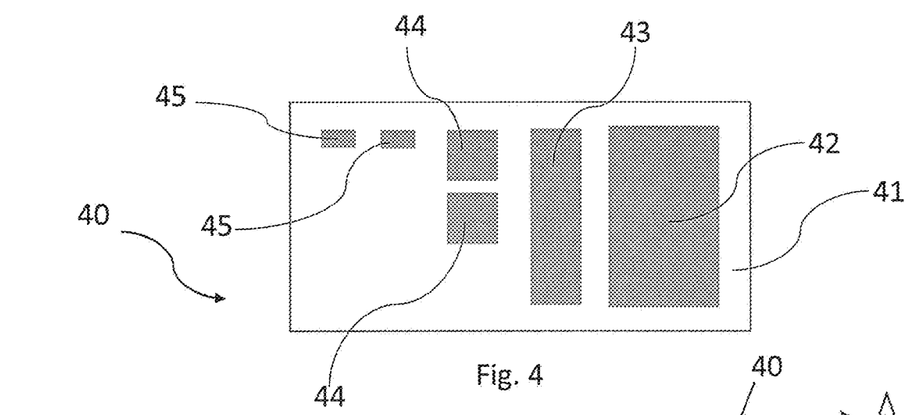
FIG. 4 shows another embodiment of a decorative HPL panel according to the present invention.

FIG. 4 shows a top view of a decorative high pressure laminate (HPL) panel 40 comprising individual several individual photovoltaic elements 42, 43, 44 and 45. The build-up of layers of decorative high pressure laminate (HPL) panel 40 may be similar to the build-up of layers as discussed in any one of FIGS. 1-3. Due to the legibility the individual layers, e.g. the décor layer, have not been shown here. Photovoltaic elements 42, 43, 44 and 45 may have different dimensions as shown here. The numbers and dimensions of photovoltaic elements 42, 43, 44 and 45 are not critical.

Figure 5:
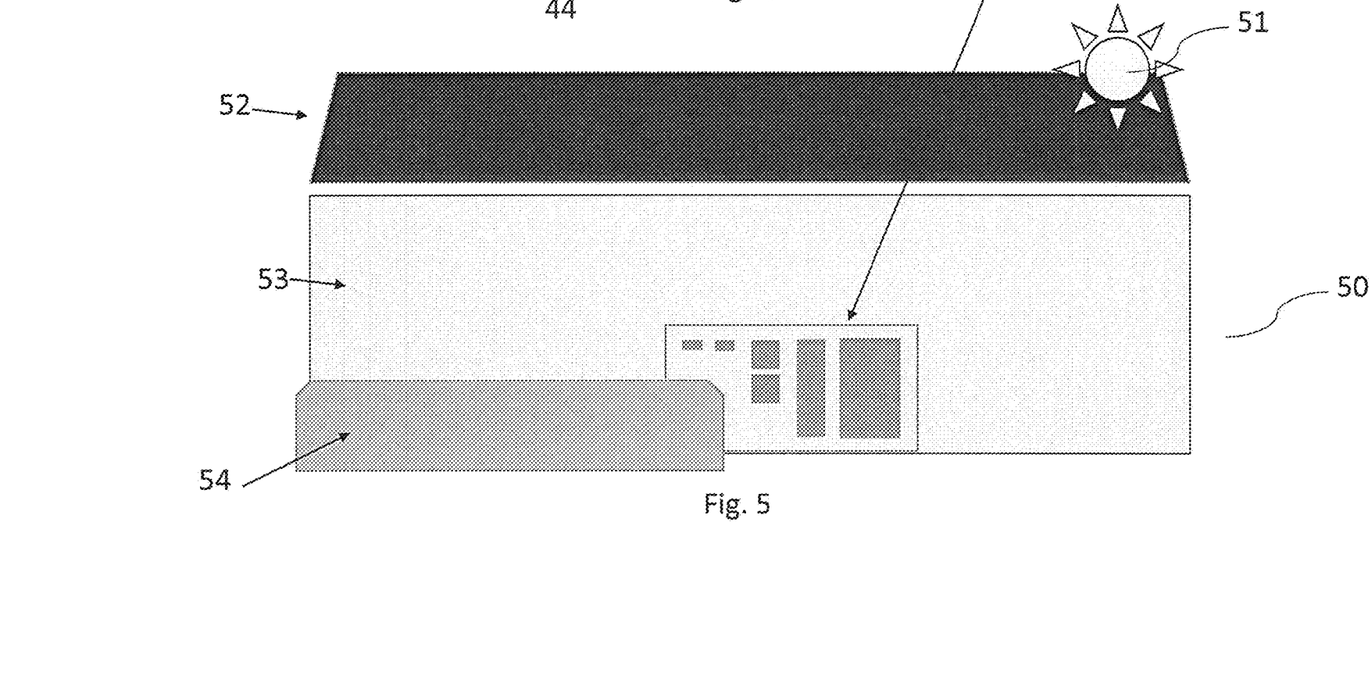
FIG. 5 shows an embodiment of the use of a decorative HPL panel according to the present invention.

FIG. 5 shows an embodiment of the use of a decorative HPL panel as shown in FIG. 4. House 50 having a roof 52 and a façade 53 is provided with a hedge of plants 54. The façade 53 is to be cladded with a decorative HPL panel having photovoltaic elements. Since the area behind the hedge of plants does not receive sunlight 51 it is not necessary to position photovoltaic elements in that area shaded by the hedge of plants 54. In this situation decorative high pressure laminate (HPL) panel 40 (see the discussion of FIG. 4) can be placed in such a way onto façade 53 that an optimum use is made of the location of the individual several individual photovoltaic elements 42, 43, 44 and 45 onto panel 40. In other words, the area of panel 40 without photovoltaic elements is positioned in the area shaded by the hedge of plants 54 and the area of panel 40 with photovoltaic elements 42, 43, 44 and 45 is irradiated by sunlight 51.

Figures 6, 7:
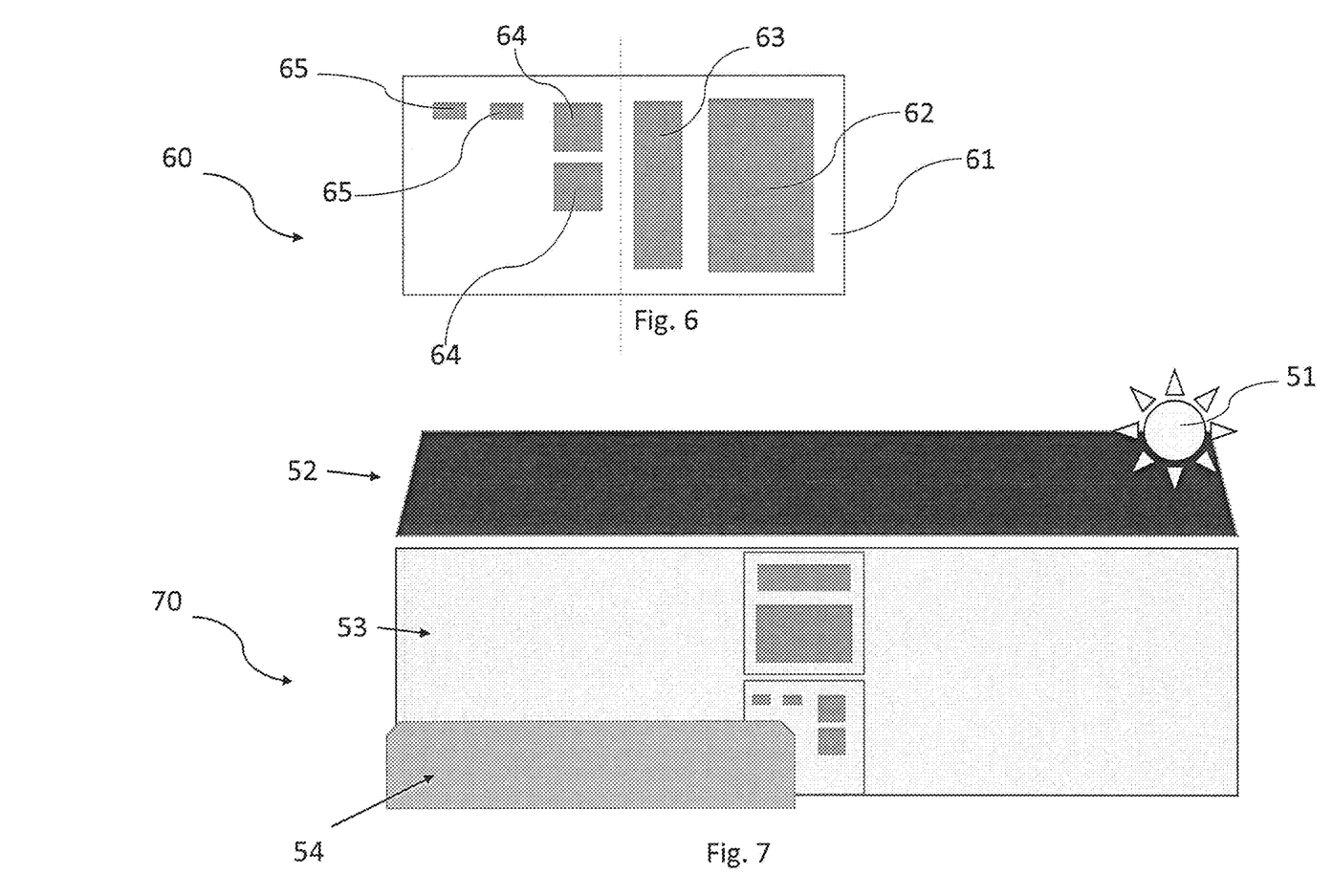
FIG. 6 shows another embodiment of a decorative HPL panel according to the present invention.
FIG. 7 shows an embodiment of the use of a decorative HPL panel according to the present invention.

FIG. 6 shows a top view of a decorative high pressure laminate (HPL) panel 60 comprising individual several individual photovoltaic elements 62, 63, 64 and 65. The build-up of layers of decorative high pressure laminate (HPL) panel 60 may be similar to the build-up of layers as discussed in any one of FIGS. 1-3. Due to the legibility the individual layers, e.g. the décor layer, have not been shown here. Photovoltaic elements 62, 63, 64 and 65 may have different dimensions as shown here. The numbers and dimensions of photovoltaic elements 62, 63, 64 and 65 are not critical.

FIG. 7 shows an embodiment of the use of a decorative HPL panel as shown in FIG. 6. House 70 having a roof 52 and a façade 53 is provided with a hedge of plants 54. The façade 53 is to be cladded with a decorative HPL panel having photovoltaic elements. Since the area behind the hedge of plants does not receive sunlight 51 it is not necessary to position photovoltaic elements in that area shaded by the hedge of plants 54. In this situation decorative high pressure laminate (HPL) panel 60 (see the discussion of FIG. 6) can be placed in such a way onto façade 53 that an optimum use is made of the location of the individual several individual photovoltaic elements 62, 63, 64 and 65 onto panel 60. In other words, the area of panel 60 without photovoltaic elements is positioned in the area shaded by the hedge of plants 54 and the area of panel 60 with photovoltaic elements 62, 63, 64 and 65 is irradiated by sunlight 51.

Figure 8:
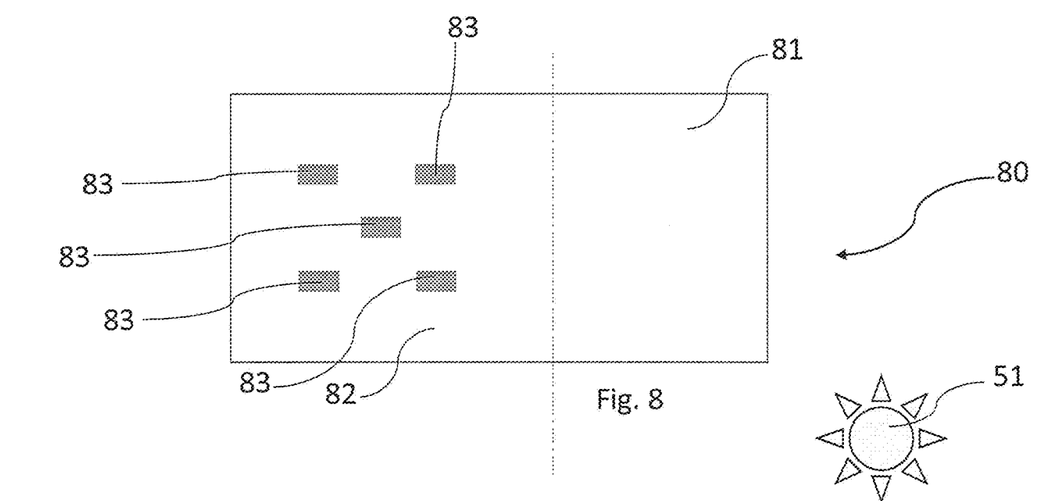
FIG. 8 shows another embodiment of a decorative HPL panel according to the present invention.
Figure 9:
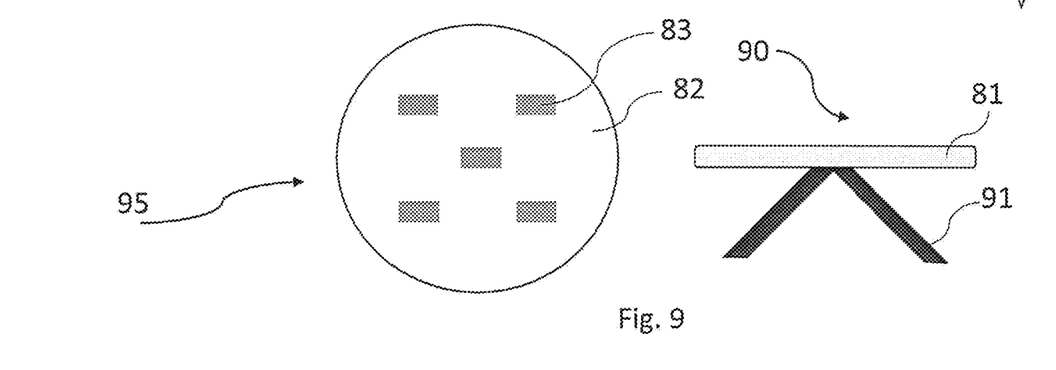
FIG. 9 shows an embodiment of the use of a decorative HPL panel according to the present invention.

FIG. 8 shows a top view of a decorative HPL panel 80 according to the present invention. The left part of decorative HPL panel 80 is provided with several individual photovoltaic elements 83. The right part of decorative HPL panel 80 is not provided with any photovoltaic element. The build-up of layers of decorative high pressure laminate (HPL) panel 80 may be similar to the build-up of layers as discussed in any one of FIGS. 1-3. Due to the legibility the individual layers, e.g. the décor layer, have not been shown here. Photovoltaic elements 83 may have different dimensions. The numbers and dimensions of photovoltaic elements 83 are not critical. Panel 80 can be divided into one or more individual HPL panel segments, wherein the HPL panel segments thus obtained may comprise HPL panel segments having one or more photovoltaic elements (this is in FIG. 8 the "left part") and HPL panel segments without any photovoltaic elements (this is in FIG. 8 the "right part"). Such a method comprises a first step of providing decorative HPL panel 80, a second step of determining a size of one or more segments in decorative HPL panel 80 and a step of cutting decorative HPL panel 80 in accordance with the size into an HPL panel segment 82 having one or more photovoltaic elements 83 and an HPL panel segment 81 without any photovoltaic elements. In FIG. 9 HPL panel segment 81 without any photovoltaic elements is used as furniture, i.e. in a table 90, consisting of table cover 81 and support means 91.

Figure 10:
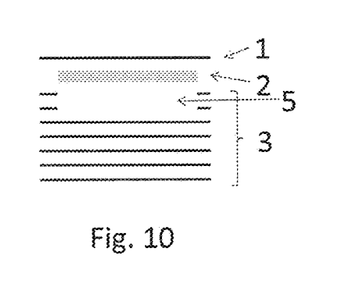
FIG. 10 shows an embodiment of a decorative HPL panel according to the present invention.

FIG. 10 shows a decorative high pressure laminate (HPL) panel, comprising an outermost décor layer 1 and a core layer 3, wherein said panel further comprises a photovoltaic element 2 for converting the energy of light into electricity by the photovoltaic effect. Photovoltaic element 2 is located between outermost décor layer 1 and core layer 3, wherein core layer 3 is provided with a recess 5. The dimensions of recess 5 are such that photovoltaic element 2 fits in that recess 5. Outermost décor layer 1 comprises a resin impregnated paper and is transparent for the wavelength of the incident light that powers photovoltaic element 2. Although photovoltaic element 2 is shown here as one single unit, photovoltaic element 2 may consist of several individual photovoltaic elements as will be shown in, for example, FIG. 4. In addition, the number of recesses may be equal to the number of photovoltaic elements. Core layer 3 is in FIG. 10 a stack of resin impregnated paper layers.

Figure 11:
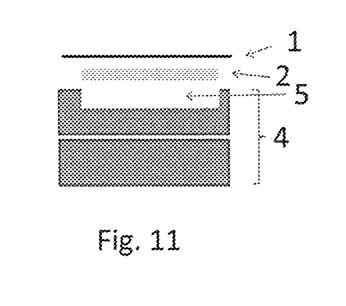
FIG. 11 shows another embodiment of a HPL decorative panel according to the present invention.

FIG. 11 shows a decorative high pressure laminate (HPL) panel, comprising an outermost décor layer 1 and a core layer 3, wherein said panel further comprises a photovoltaic element 2 for converting the energy of light into electricity by the photovoltaic effect. Photovoltaic element 2 is located between outermost décor layer 1 and core layer 4, wherein core layer 3 is provided with a recess 5. The dimensions of recess 5 are such that photovoltaic element 2 fits in that recess 5. Outermost décor layer 1 comprises a resin impregnated paper and is transparent for the wavelength of the incident light that powers photovoltaic element 2. Although photovoltaic element 2 is shown here as one single unit, photovoltaic element 2 may consist of several individual photovoltaic elements as will be shown in, for example, FIG. 4. In addition, the number of recesses may be equal to the number of photovoltaic elements. In FIG. 11 core layer 4 is a prepreg but other types of core layers can be used as well.

The present inventors thus found that PV elements can be included in a stack of prepregs to make a HPL. The PV elements remain functional after processing. The aesthetics of the panel is remained by covering the PV element with a decorative paper, prior to the press cycle. The performance of the PV element is decreased after it is covered, but its functionality remains.

Example 1

A thin film photovoltaic element of 1.5×6 cm, of similar type as amorphous silicon thin-film solar panels from PowerFilm Solar, is added in a stack of prepreg and decorative melamine impregnated papers as the build-up in FIG. 3 depicts. The photovoltaic element is placed between two melamine impregnated decorative papers. The contact pads of the PV element are marked at the outermost side of the decorative paper, in order to localize the connection points. Also, a non-adhering polymer film is placed on top of the pads, to favour a good electrical contact between the measurement probes and the pads after pressing. Before integration the PV element into the panel, the readout was ca 4V.

The panel is pressed at 160° C., 70 bars for 20 min. The panel is cooled down to room temperature.

After the panel pressing the photovoltaic element is no longer visible at the surface of the panel. At the marks, the decorative paper was cut open, to reach the contact pads with the probes of a multimeter NI72 from Nieaf instruments. The readout was 3.1 V. When no light is reaching the panel surface, i.e. the whole panel is covered the reading decreased to 0.4 V. After full exposure (uncovered PV element), the readout increased to 3.1 V. This procedure was repeated several times, with the same results. The readout remained identical 1 day after pressing.

Example 2

To make the photovoltaic element invisible on the HPL panel, and to match PV-panels with non-PV panels, the inventors covered 6V2W solar panel of monocrystalline solar cells by Voltaic systems with a décor layer that is also used for standard HPL panels. As a first step the electricity generated by a PV cell with and without the cover of a décor is analysed. The PV cell was illuminated by an interior lamp of 18W 2700K 1521lm. The conversion of light was measured by the potential difference in V, read by a multimeter NI72 from Nieaf instruments The PV cell was covered by a décor. To make sure that light only passes through the décor and not from edges, the décor covering the PV cell was minimum 5 cm wider than the PV cell. Reference controls of the multimeter readout of a non-covered PV cell was collected between each second décor, and these readouts were stable during the whole cycle.

Figure 12:
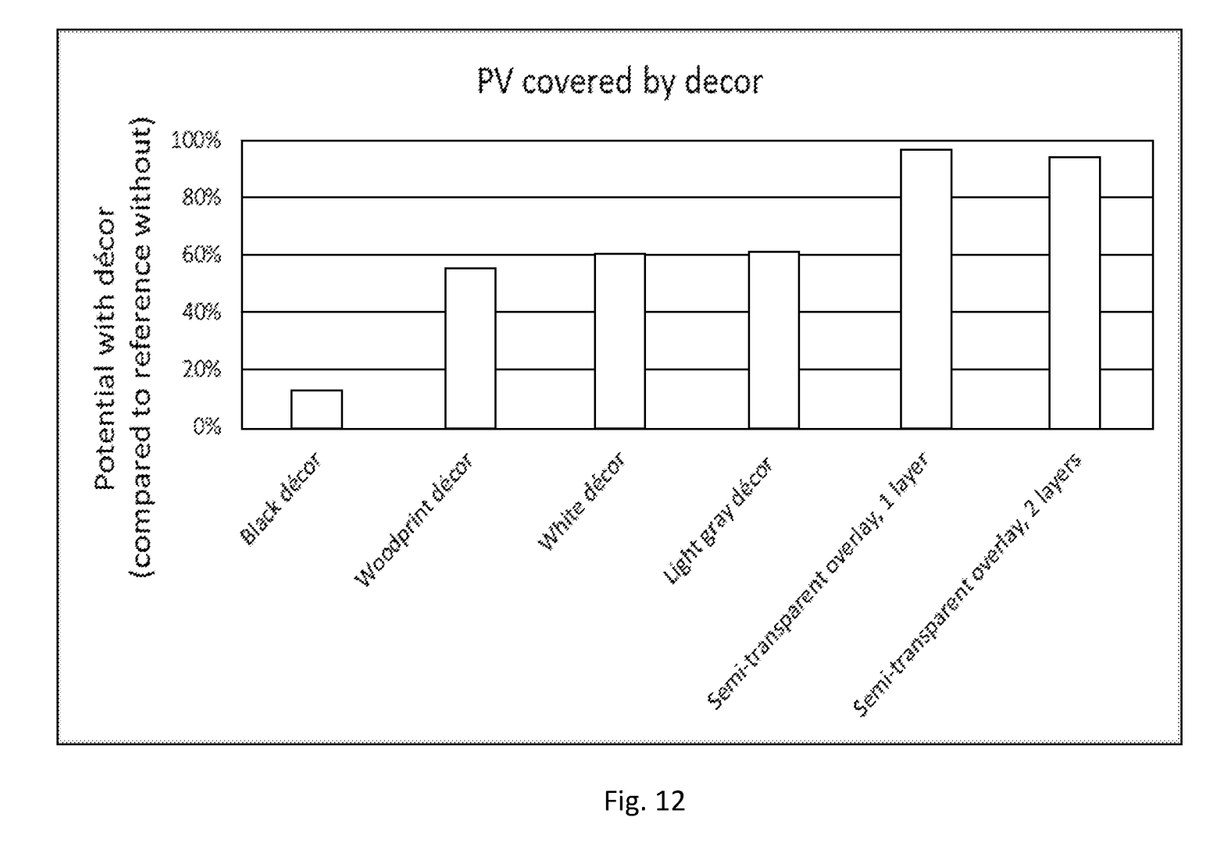
FIG. 12 shows a graph of transparency evaluation according to the present invention.
Figure 13:
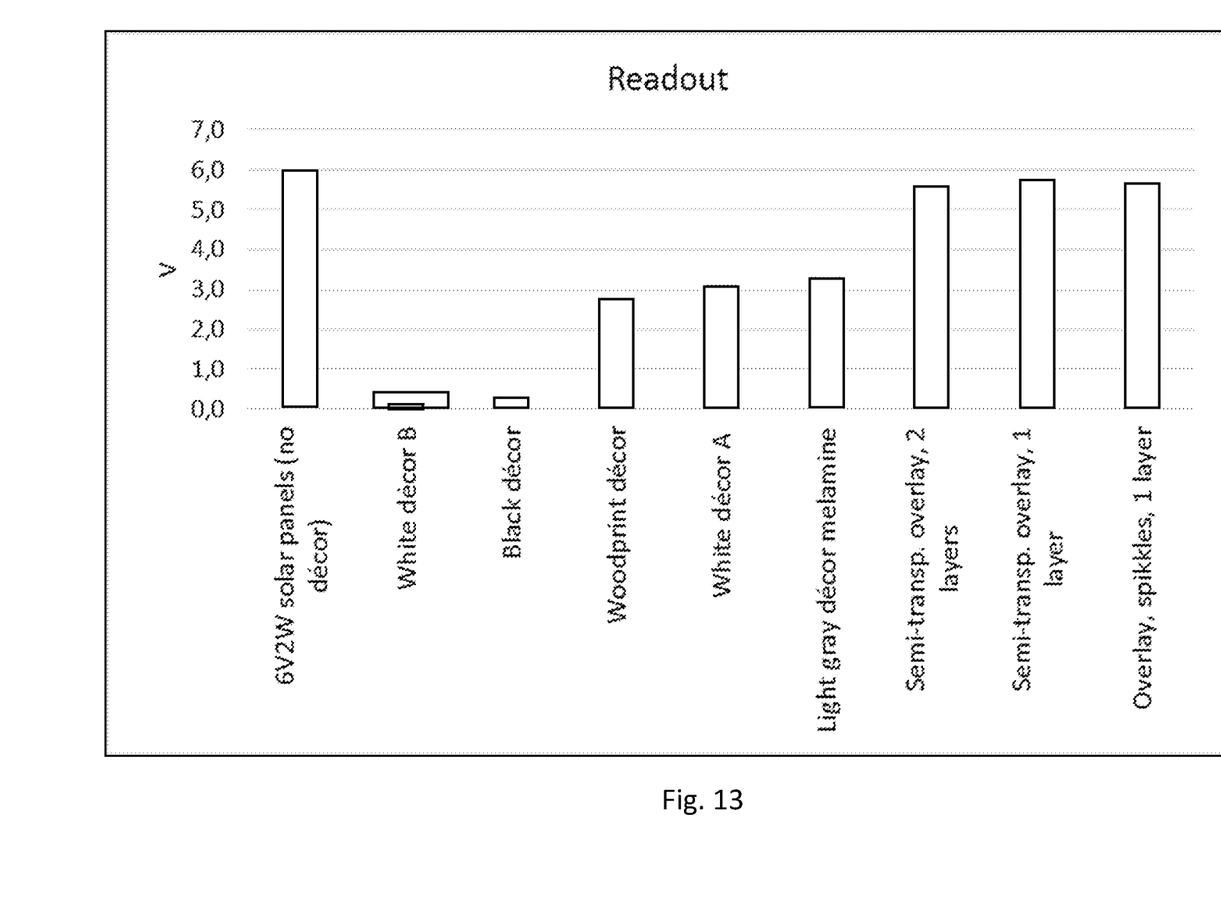
FIG. 13 shows another graph of transparency evaluation according to the present invention.

The transparency of the decors were evaluated as the difference in potential (V) of uncovered and covered PV, see FIGS. 12 and 13 and the table below. Black décor is a light absorbing color for the visible spectra, which is confirmed in the results where the black décor has the lowest out-put. Lighter decors (wood prints, white and light grey) are less absorbing, and thus lets more light through to the PV. On the other hand, white is reflecting all wavelengths in the visible spectra, still surprisingly there is more light to generate electricity for these decors compared to the black one. The reason for the increased light though put lays in the opacity of the colors in the wavelengths range that the PV cell is absorbing. The latter is not only in the visible spectra but also at larger wavelengths (infra-red). With a semi-transparent overlay, the PV is the least covered, and there is a minor decrease in the output of generated power.

|  | Readout multimeter | |
| --- | --- | --- |
|  | V | % |
| 6V2W solar panels of monocrystalline solar cells by Voltaic systems (no décor) | 5.9 |  |
| White décor B (on black paper) | 0.2 | 3% |

-continued

|  | Readout multimeter | |
|---|---|---|
|  | V | % |
| Black décor | 0.2 | 3% |
| Woodprint décor | 2.8 | 47% |
| White décor A (on white paper) | 3.1 | 52% |
| Light gray décor melamine | 3.3 | 55% |
| Semi-transparent overlay, 2 layers | 5.6 | 94% |
| Semi-transparent overlay, 1 layer | 5.8 | 97% |
| Semi-transparent overlay, spikkles, 1 layer | 5.7 | 95% |

The results in Example 2 show that part of the incoming light is not converted to electricity by the PV module. The inventors assume that part of the incoming light is stopped by the decorative layer (décor). The thinner and more optical transparent the decorative layer is, the more electricity is converted by the PV. The semi-transparent overlay is only slightly affecting the power conversion (under the circumstances for this test), while the black decorative layer, which is absorbing large part of the visible spectra (i.e. being black in color), shows a significant lower power conversion.

Example 3

To make the photovoltaic element invisible on the HPL panel, and to match PV-panels with non-PV panels, the inventors covered 6V2W and 6V6W solar panels of monocrystalline solar cells by Voltaic systems with a décor layer that is also used for standard HPL panels. The purpose of this experiment is to demonstrate the function of the décor-covered solar cell. The décor layer was fixed on the solar panel by hotmelt transfer printed glue. As a first step the electricity generated by the solar panel with and without the cover of a décor was measured. The PV cell was illuminated by an interior lamp of 18W 2700K 1521lm. The conversion of light was measured by the potential difference in V, read by a multimeter NI72 from Nieaf instruments.

|  | Readout multimeter | |
|---|---|---|
|  | V | % |
| 6V2W solar panels of monocrystalline solar cells by Voltaic systems (no décor) | 5.9 |  |
| White décor A glued on PV | 4.1 | 69% |
| 6V6W solar panels of monocrystalline solar cells by Voltaic systems (no décor) | 6.0 |  |
| White décor A in a 0.9 thin laminate panel, glued on PV | 1.4 | 23% |

The results in Example 3 show that part of the incoming light is not converted to electricity by the PV module. The inventors assume that part of the incoming light is stopped by the decorative layer (décor) and the glue. The thinner and more optical transparent the decorative layer is, as shown by the example where the white décor is glued directly on the PV cell, the more electricity is converted by the PV. The thin laminate made by the same white décor including 3 kraft papers, shows a significant lower power conversion.

Example 4

A thin film solar cell by organic photovoltaic material from Infinity OPV (roll to roll fabricated cells, school sets) is added in a stack of prepreg and decorative melamine impregnated papers as the build-up in FIG. 3 depicts. The photovoltaic element is placed between two melamine impregnated decorative papers. The contact pads of the PV element are marked at the outermost side of the decorative paper, in order to localize the connection points. Also, a non-adhering polymer film is placed on top of the pads, to favour a good electrical contact between the measurement probes and the pads after pressing. Before integration the PV element into the panel, the readout was ca 5V, measured by a multimeter NI72 from Nieaf instruments.

The panel is pressed at 130° C., 70 bars for 40 min. The panel is cooled down to room temperature.

After the panel pressing the photovoltaic element is no longer visible at the surface of the panel. At the marks, the decorative paper was cut open, to reach the contact pads with the probes of the multimeter NI72 from Nieaf instruments. The energy converting functions were no longer active, no power was created upon light exposure. The inventors assume that the contact pads were shortcut, since the inventors measured resistance between the contact pads. The inventors assume that the organic photovoltaic material was damaged by the processing condition while processing the panel.

Example 4

To demonstrate the effect of not having a recess in the stack of resin impregnated papers, to not only level the surface but also to keep the photovoltaic cells on place, the inventors added a monocrystalline solar panel (SUNBEAM system Nordic 50W flexible solar panel, 50 W) in a stack of prepreg and decorative melamine impregnated papers as shown in the enclosed figure. As seen in the figure, two sides of the solar panels was confined by prepreg 'walls' which represents walls of a recess. The other two sides of the solar panel, there were no walls.

The panel is pressed at 130° C., 70 bars for 40 min. The panel is cooled down to room temperature.

After the panel pressing the panel surface is flat, and the PV is not is not visible at the surface. At the sides where the PV was protected by the recess-walls, the solar panel remained confined to its original position after that the panel was pressed. While at the other two sides, without recess-walls, the solar panel material were flowing away during the pressing process. Due to the flowing of the PV materials, the photovoltaic effect could not be measured after panel pressing. The inventors assume this is caused by broken contacts and disrupted PV cells.

It is to be noted that a number of coloured PV panels have appeared on the market. These coloured PV panels make use of a selected printing technology where not the whole surface area of the PV is covered by a print, but the color is printed in dots that are separated by a space which is small enough to be seen, and large enough to let through enough light to the PV. In other applications a smart color filter is applied which reflects one specific color and lets through all other wavelengths which get converted to electricity in the underlayers. In both cases the efficiency of the PV is (partly) decreased based on the same principle, less light is entering the PV module. Both above described methods for color filters are applied on top of the PV module, mainly onto the glass that covers the PV cells, and the methods includes precision technologies as inkjet printing and deposition of nanomaterials.

The present invention has a completely different approach in coloring the PV module, namely by making use of large volume production technologies already applied for building materials, and especially suitable, but not limited to, façade panels such as HPLs. According to the present invention a decorative layer is positioned on top of the photovoltaic module. The decorative layer, décor, consists of a paper impregnated by thermoset resins, with or without coatings giving color (pigment filled coatings) and other surface specific qualities as for example resistance to scratch, abrasion, UV-light and weather wear. The light throughput, i.e. transparency, of the décor depends on the filler type and content in the paper, resins and coats. The higher content of light absorbing or reflecting pigments, the less light is passed through the décor to the PV module.

Thus, in the present decorative high pressure laminate (HPL) panel the photovoltaic element needs to be transparent, semi-transparent or partly transparent in the wavelength range of wavelengths that the photovoltaic element is absorbing. The transparency is depending on the opacity of the décor, the light absorbing/reflecting pigments and the homogeneity of the pigments (as homogeneous covering or clusters). Examples of the three types of decors are: overlay, which is close to transparent in color; white décor, which is semi-transparent; and woodprint décor, which is partly transparent.

The invention claimed is:

1. A decorative high pressure laminate (HPL) panel, comprising:
an outermost décor layer;
a core layer;
at least one intermediate layer positioned between the outermost décor layer and the core layer; and
at least one photovoltaic element for converting energy of light into electricity by a photovoltaic effect;
wherein the at least one photovoltaic element is positioned between the outermost décor layer and the at least one intermediate layer;
wherein the outermost décor layer comprises a resin impregnated paper and is transparent to a wavelength of incident light that powers the at least one photovoltaic element; and
wherein the at least one intermediate layer comprises a resin impregnated paper having an inhomogeneous resin distribution, wherein resin concentration in the resin impregnated paper at an area corresponding to the position of the at least one photovoltaic element is higher than another area of the resin impregnated paper away from the at least one photovoltaic element.

2. The decorative HPL panel according to claim 1, wherein the at least one photovoltaic element is not visible through the outermost décor layer.

3. The decorative HPL panel according to claim 1, wherein the resin impregnated paper of the décor layer comprises pigments.

4. The decorative HPL panel according to claim 1, wherein the resin impregnated paper of the décor layer comprises a thermoset resin selected from the group including phenol resin, melamine resin, urea resin, epoxy resin, polyester resin, polyisocyanate resin, melamine acrylate, polyurethane acrylate and combinations thereof.

5. The decorative HPL panel according to claim 1, further comprising an adhesive layer positioned between the at least one photovoltaic element and the at least one intermediate layer.

6. The decorative HPL panel according to claim 5, wherein the adhesive layer comprises a thermoset resin selected from the group including phenol resin, melamine resin, urea resin, epoxy resin, polyester resin, polyisocyanate resin, melamine acrylate, polyurethane acrylate and combinations thereof.

7. The decorative HPL panel according to claim 1, further comprising a plurality of photovoltaic elements having different dimensions.

8. The decorative HPL panel according to claim 1, wherein the at least one photovoltaic element is a thin film organic or inorganic photovoltaic element.

9. The decorative HPL panel according to claim 1, wherein the core layer further comprises a décor layer positioned on a side of the décor layer facing away from the at least one photovoltaic element.

10. The decorative HPL panel according to claim 1, further comprising at least one of a light source, a temperature sensor, and an air quality sensor, electrically connected to the at least one photovoltaic element.

11. The decorative HPL panel according to claim 1, wherein the at least one intermediate layer comprises thermal conductive material.

12. The decorative HPL panel according to claim 1, wherein the at least one intermediate layer comprises a resin impregnated kraft paper, wherein the resin is selected from the group including phenol resin, melamine resin, urea resin, epoxy resin, polyester resin, polyisocyanate resin, melamine acrylate, polyurethane acrylate and combinations thereof.

13. The decorative HPL panel according to claim 1, wherein the core layer comprises resin impregnated papers, prepregs, non-wovens and wovens of wood fibres, glass fibres, textile fibres, synthetic fibres, metallic fibres, ceramic fibres and carbon fibres, or a combination thereof.

14. The decorative HPL panel according to claim 13, wherein the core layer comprises one or more recesses in which the at least one photovoltaic element is positioned.

15. The decorative HPL panel according to claim 14, wherein the core layer comprises a thermo pressed stack of resin impregnated papers and the at least one photovoltaic element is positioned within the one or more recesses provided in the thermo pressed stack of resin impregnated papers.

16. The decorative HPL panel according to claim 1, wherein the décor layer comprises a substrate layer comprising resin impregnated papers, non-wovens and wovens of any one or more of wood fibres, glass fibres, textile fibres, synthetic fibres, metallic fibres, ceramic fibres and carbon fibres, or a combination of these fibres, polymeric foils, metallic foils and ceramic foils, or a combination of any one of these foils.

17. The decorative HPL panel according to claim 1, wherein the at least one photovoltaic element is rigid or flexible and is deposited on a flexible carrier comprising at least one of paper, plastic foil, metal, ceramic, glass and a textile.

18. The decorative HPL panel according to claim 1, wherein the decorative HPL panel is provided in an outer cladding of a building.

* * * * *